US009127444B2

(12) United States Patent  (10) Patent No.: US 9,127,444 B2
Stukey et al.  (45) Date of Patent: Sep. 8, 2015

(54) TRANSITION END FOR A PLASTIC PIPE AND METHOD OF INSTALLATION (71) Applicants: Leland P. Stukey, Plainview, TX (US);
Gaylen R. Stukey, Plainview, TX (US);
Jess Sammann, Plainview, TX (US)

(72) Inventors: Leland P. Stukey, Plainview, TX (US);
Gaylen R. Stukey, Plainview, TX (US);
Jess Sammann, Plainview, TX (US)

(73) Assignee: Poly Rig Company, Inc., Plainview, TX (US)

( * ) Notice: Subject to any disclaimer, the term of this patent is extended or adjusted under 35 U.S.C. 154(b) by 361 days.

(21) Appl. No.: 13/627,040

(22) Filed: Sep. 26, 2012

(65) Prior Publication Data
US 2013/0075082 A1 Mar. 28, 2013

Related U.S. Application Data (60) Provisional application No. 61/540,170, filed on Sep. 28, 2011.

(51) Int. Cl.
*E21B 17/02* (2006.01)
*E03B 3/16* (2006.01)
*F16L 47/24* (2006.01)

(52) U.S. Cl.
CPC . *E03B 3/16* (2013.01); *E21B 17/02* (2013.01); *F16L 47/24* (2013.01); *Y10T 29/4994* (2015.01)

(58) Field of Classification Search
CPC combination set(s) only.
See application file for complete search history.

(56) References Cited

U.S. PATENT DOCUMENTS

| 4,152,821 | A | * | 5/1979 | Scott | 29/421.1 |
|---|---|---|---|---|---|
| 4,715,624 | A | | 12/1987 | Frye | |
| 5,367,756 | A | | 11/1994 | Huetinck | |
| 5,590,914 | A | | 1/1997 | Platner et al. | |
| 6,237,963 | B1 | | 5/2001 | Hall | |
| 6,896,297 | B2 | | 5/2005 | Hall | |
| 7,571,764 | B1 | * | 8/2009 | Sammann | 166/75.13 |
| 2008/0001400 | A1 | * | 1/2008 | Winzeler | 285/258 |

* cited by examiner

*Primary Examiner* — David J. Bagnell
*Assistant Examiner* — Taras P Bemko
(74) *Attorney, Agent, or Firm* — Charles D. Gunter, Jr.

(57) ABSTRACT

An apparatus and method are shown for installing a metal transition end on an open end of a length of plastic pipe having an outer diameter and an inner diameter by placing a stiffener sleeve within the inner diameter of the plastic pipe at a point which is circumscribed by the metal transition end. An actuating sleeve, carried on the draw rod, allows the stiffener sleeve to be installed in a desired location within the open plastic pipe end by using the draw rod to first position the stiffener sleeve in the desired location. The metal transition end is provided with an internal relief groove which accepts any excess plastic material forced past the stiffener sleeve during the installation process.

8 Claims, 11 Drawing Sheets

TRANSITION END FOR A PLASTIC PIPE AND METHOD OF INSTALLATION

CROSS-REFERENCE TO RELATED APPLICATION

The present application claims priority from earlier filed provisional application Ser. No. 61/540,170, filed. Sep. 28, 2011, entitled "Transition End to a Plastic Pipe and Method of Installation", by the same inventors.

BACKGROUND OF THE INVENTION

1. Field of the Invention

The present invention relates generally to an apparatus and method for installing an improved transition end, such as a threaded metal fitting, onto a terminating end of a plastic pipe in order to connect the plastic pipe to other associated metal components.

2. Description of the Prior Art

There is an ever increasing need for providing reliable interconnections between plastic pipe and metal components. As one example, modern water wells are drilled into the ground with the well bore either being uncased, or being protected by a casing which is sunk into the well. Typically, a submersible pump is then installed in the well bore on either rigid or flexible tubing and submerged in water located at the bottom of the well. The pump provides water to the surface through the flexible tubing which is connected to the pump and which leads up the well bore to the well surface. Although various types of flexible tubing are known, the most commonly used tubing today is a polyolefin, such as polyethylene. At the well surface, it is generally necessary to transition the plastic pipe to a metal coupling which, in turn, allows the pipe to be connected to metal components in the flow line.

Another example of the need for such a transition end on plastic pipe exists in the area of natural gas production and transmission lines. Modern gas utilities have broadly adopted plastic pipe for use with underground natural gas distribution and transmission systems. For example, in the supplying of natural gas, it is customary, at the present time, that the main lines located in the street are constructed of steel whereas feeder or service lines to houses and adjacent buildings are most frequently constructed of a plastic, such as polyethylene. Also, it is required that steel pipe be used above ground in making connections to gas regulators and meters, which frequently interconnect the underground plastic pipe to the main via so-called "risers". Still further, steel line extensions commonly join to plastic mains. Consequently, many local and state governmental regulatory agencies have adopted safety codes which require above ground gas meter risers to be constructed of relatively rigid and durable metallic materials which protect against deterioration and external damage of an otherwise plastic riser assembly. Therefore, it is necessary to transition such subterranean plastic pipe to metallic risers for above ground use. In each of these situations, it is necessary to provide a suitable transition fitting that will accommodate both the plastic pipe and associated steel components.

A number of different techniques and devices have been used in the past to accomplish this task. For example, U.S. Pat. No. 6,896,297 to Central Plastics Company shows a device in which an internal stiffener sleeve is inserted within the plastic pipe in order to secure a surrounding metal transition end to a short section of pipe. The disadvantage of the technique shown in this patent is that the technique is not practical for a typical field installation since the section of plastic pipe with the transition end attached would then have to be butt welded to the remaining length of the plastic pipe, as well as presenting other complications.

U.S. Pat. No. 5,367,756 and U.S. Pat. No. 5,590,914 both show what appear to be related approaches to solving the problem. They are inserting a stiffener sleeve from the exterior of the metal pipe end, rather than from the interior of the plastic pipe. However, they appear to be installing the stiffener sleeve by forcing it downwardly into the mouth of the metal pipe and plastic pipe throat. It also appears that the stiffener sleeve used with the '914 and '756 patents is a relatively complex assembly and produces a poorly installed end.

U.S. Pat. No. 6,237,963 shows a device and method which are used in solving the same general type of problem but the steel pipe 11 is swaged down during the process to form a swage groove around the retainer sleeve, thereby compressing the gasket located there between.

U.S. Pat. No. 4,715,624 uses a specially designed piston which allows some movement between the plastic and steel components to relieve thermal stress. The patent actually teaches that it is disadvantageous to provide a compression fitting where the plastic is compressed because of the tendency to cold flow with a resulting reduction in holding strength over time (see column 1, lines 40-49).

While the above patents are representative of the advances which have been made in the prior art, there remains a need for further improvements. For example, it would be advantageous to provide a method using an apparatus for attaching a metal transition end to a section of plastic pipe or other pipe of the type used in submersible pump system in which an internal stiffener is installed from the open plastic pipe end rather than from the opposite end of the length of plastic pipe.

This type of method and apparatus could be used for field assemblies and would not require butt welding of sections of plastic pipe, since the internal stiffener is installed from the open plastic pipe end, rather than being inserted and then either pushed or pulled into position from the interior of the opposite end of the plastic pipe.

SUMMARY OF THE INVENTION

The present invention provides a field completion tool and method for installing the transition end on an open end of a piece of plastic pipe, such as pipe used in a water well, or in attaching plastic underground gas transmission pipe to a metallic gas riser pipe. The installer apparatus of the invention has a first stationary section which includes a top plate having an outer planar surface and an inner planar surface and a plurality of tie rods being arranged generally perpendicular to the inner planar surface of the top plate. The stationary section of the apparatus further includes a cooperating clamping ring installable upon the plurality of tie rods at an end thereof opposite the top plate. The clamping ring also has a central pipe receiving opening for receiving and securely grasping the open end of the plastic pipe.

The apparatus also has a second, mobile section which includes a sliding plate mounted on the tie rods between the top plate and the clamping ring. The sliding plate has a working cylinder mounted thereon for cooperative movement with the sliding plate. The sliding plate has a central opening aligned with the central pipe receiving opening and an draw rod which extends outwardly from the working cylinder along a longitudinal axis generally aligned with the central opening of the sliding plate An actuating sleeve is carried on the draw rod and is slidable along its longitudinal axis. The draw rod also has a segmented grip which is radially expandable and contractable upon longitudinal movement of the actuating sleeve on the draw rod in order to grasp and release a stiffener sleeve.

Once the metal transition end is installed in a position surrounding the plastic pipe end, the apparatus is actuated in sequential fashion to cause the draw rod and segmented grip to install the stiffener sleeve in a position within the interior of the plastic pipe which underlies the bore of the transition end, to thereby thinly secure the metal transition end on the plastic pipe. After installing the stiffener sleeve in the desired position, the actuating sleeve is withdrawn from the segmented grip by sliding it along the draw rod, to thereby radially contract the segmented grip to thereby release the stiffener sleeve and allow the draw rod to be withdrawn from the open pipe end and complete the assembly operation.

Preferably, the actuating sleeve which is carried on the draw rod has a stepped outer diameter which is larger in the direction of the working cylinder and relatively smaller in the direction of the segmented grip. The segmented grip of the draw rod is a cylindrically shaped body made up of a plurality of pie-shaped segments which move radially inward and outward upon longitudinal movement of the actuating sleeve along the draw rod.

The preferred clamping ring is made up of two locking halves which are connected along a pivot axis, whereby the two halves can be pivoted apart to form a pipe receiving opening. The central opening of the clamping ring is provided with a pair of interchangeable gripping jaws which are capable of gripping and engaging an outer surface of various sizes of plastic pipe inserted between the two locking halves of the clamping ring. The clamping ring preferably has an upper planar surface and a lower planar surface, and wherein mating holes are provided in the clamping ring which communicate the upper and lower planar surfaces. These holes are preferably keyhole shaped, whereby the tie rod can be inserted into the keyholes and the tie rods can then be rotated into an engaged position to temporarily secure the clamping ring to the tie rods. The clamping ring can also serve as a pipe support or elevator for the plastic pipe during and after the installation of the pump in the well bore. The lower planar surface of the clamping ring is recessed slightly adjacent the keyhole shaped openings to facilitate engagement of the tie rod ends.

The apparatus of the invention can be used in a method for installing a metal transition end on a length of plastic pipe having an outer diameter and an inner diameter by placing a stiffener sleeve within the inner diameter of the plastic pipe at a point which is circumscribed by the metal transition end. In the method of the invention, a metal transition end is provided having an internal shoulder which creates a stepped internal diameter. The internal shoulder divides the internal diameter into a region of lesser relative diameter and a region of greater relative diameter. The length of plastic pipe has an open end portion which is slidingly received within the metal transition end abutting the internal shoulder formed within the internal diameter of the transition end.

The apparatus of the invention is installed over the length of plastic pipe and the metal transition end from the direction of the open plastic pipe end. As has been described, the installer apparatus is provided with a working cylinder and sliding plate which cooperate with a draw rod which carries a segmented grip at one end. A metal stiffener sleeve is temporarily mounted on the segmented grip of the draw rod. The working cylinder, sliding plate, actuating sleeve and draw rod are then used to install the stiffener sleeve in a desired location within the interior of the plastic pipe. The stiffener sleeve serves to secure the metal transition end on the open end of the plastic pipe. After installation of the stiffener sleeve, the apparatus is removed from the pipe from the direction of the open pipe end.

An improved transition end is also provided for use with the apparatus of the invention. The transition end is installed upon a free end of a length of plastic pipe to transition the plastic pipe end to other metal components in a flow line. The improved transition end is a generally cylindrical metal body having a top end with a top end opening and a bottom end with a bottom end opening and an interior surface extending there between. The interior surface adjacent the bottom end opening is a grooved surface, the grooved surface extending upwardly from the bottom end opening to a downwardly facing internal shoulder which is of lesser relative diameter than the grooved surface.

The grooved surface terminates in a relief groove which is provided adjacent the downwardly facing internal shoulder, the relief groove being of sufficient depth to accept excess plastic material present as a result of installing the transition end on a plastic pipe.

The top end of the transition end can be a female, internally threaded member, or alternatively, a male, externally threaded member. The generally cylindrical metal body can also be provided with an external groove located between the top end opening and the bottom end opening thereof, the external groove being sized to receive a well head plate.

These and other aspects of the invention will be better appreciated and understood when considered in conjunction with the following detailed description and accompanying drawings. It should be understood, however, that the following descriptions, while indicating preferred embodiments and numerous specific details thereof, are given by way of illustration and not of limitation and that additional objects, features and advantages will be apparent from the written description which follows.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Figure 1:
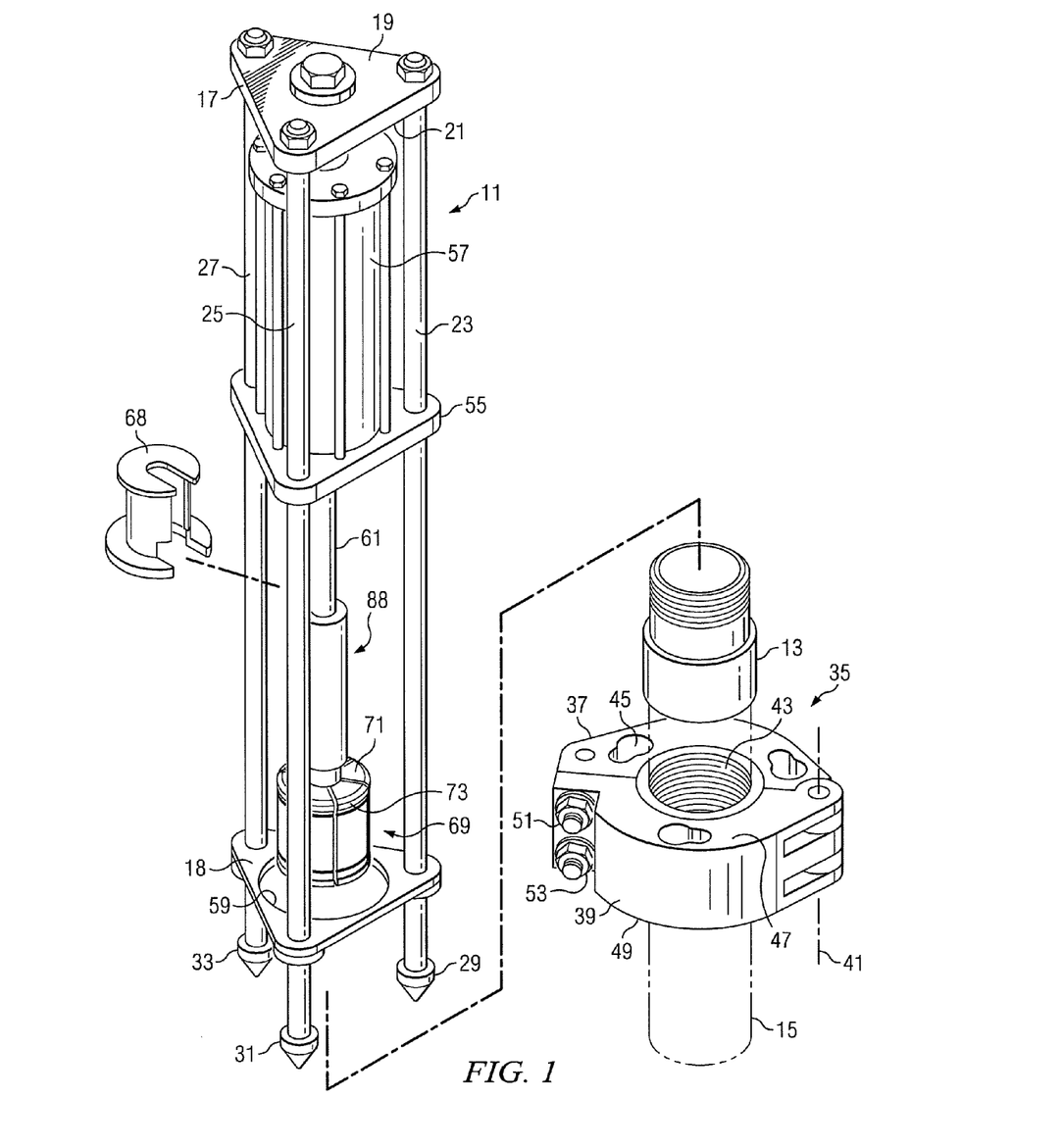
FIG. 1 is a perspective view of the apparatus used in the method of the invention with portions thereof shown in exploded fashion for ease of illustration.

Turning first to FIG. 1 of the drawings, there is shown an apparatus of the invention, designated generally as 11. The apparatus 11 is shown in exploded fashion in order to better illustrate the operative components thereof. It will also be understood in the discussion which follows that while the drawings are shown generally vertically oriented for ease of placement on the page, that the apparatus may also be positioned in a horizontal plane in some situations.

The apparatus 11 shown in FIG. 1 is used to install a metal transition end (13 in FIG. 1) on an open end of a length of plastic pipe (shown as 15 in phantom lines in FIG. 1). By "open end" is meant the proximate end 15, it being understood that the length of plastic pipe might extend for many feet in the opposite direction and might be stored, for example, on a take up reel (not shown). It will also be understood that, while "metal" transition ends are presently the standard in the industry, other materials such as carbon composites and the like might also be utilized for the transition end. The apparatus 11 illustrated in FIG. 1 in perspective fashion, and shown in FIGS. 2a-2k in partial cross section, includes a first stationary section which includes a top plate 17 having an outer planar surface 19 and an inner planar surface 21. A plurality of tie rods 23, 25, 27, are arranged generally perpendicular to the inner planar surface 21 of the top plate 17 and extend downwardly therefrom to a spaced apart support plate 18. The tie rods lie in planes which form an equilateral triangle and form a sort of triangular frame for the stationary section components of the apparatus. The tie rods also have tapered outer ends 29, 31, 33, which terminate in top-shaped, triangular points. The plates 17 and 18 are fixed relative to one another and do not move during the operation of the apparatus.

The stationary section of the apparatus, once assembled, further includes a cooperating clamping ring (shown in perspective fashion as 35 in FIG. 1). The clamping ring is made up of two locking halves 37, 39, which are connected along a pivot axis 41, whereby the two halves 37, 39, can be pivoted apart to form a pipe receiving opening (generally at 43 in FIG. 1). Alternatively, the clamping ring 35 could comprise two bolted halves or sections. As can be seen in FIG. 1, the central opening 43 of the clamping ring 35 is provided with a pair of mating gripping jaws (such as jaw 43). The jaws are interchangeable to accommodate different diameter plastic pipe, e.g., 2 inch, 4 inch, etc. The jaws have gripping surfaces which are adapted to engage an outer surface of the plastic pipe 15 once the pipe end has been inserted between the two locking halves of the clamping ring. The clamping ring 35 is installable upon the tie rods ends at a location opposite the top plate 17 by passing the tie rod ends through mating openings (such as opening 45 in FIG. 1) provided in the clamping ring 35.

Preferably, the clamping ring 35 has an upper planar surface 47 and a lower planar surface 49. There are preferably three holes 45 provided in the clamping ring which communicate the upper and lower planar surfaces 47, 49. The holes 45 are preferably keyhole shaped, whereby the tapered tie rod ends 29, 31, 33, can be passed through the holes and the tie rods can then be rotated into an engaged position to temporarily secure the clamping ring to the tie rods. The clamping ring 35 also has locking region, such as that formed by the locking bolts 51, 53, which can be engaged so that the pipe receiving opening 43 is able to receive and securely grasp the open end of the plastic pipe. FIGS. 2e and 2f show the clamping ring 35 engaged in place on the tie rods and engaging the end of a piece of plastic pipe 15. The lower planar surface of the clamping ring adjacent the keyhole shaped holes is slightly recessed in order to facilitate the engagement and disengagement of the tapered tie rod ends. The clamping ring 35 not only serves as a component of the installer apparatus of the invention, but can serve the additional purpose of acting as a pipe support or pipe elevator with respect to a well installation.

Returning to FIG. 1, the apparatus of the invention also includes a mobile section which is made up of several different operative components. A sliding plate (55 in FIG. 1) is mounted on the tie rods 23, 25, 27, between the top plate 17 and the support plate 18 on bores which allow the plate to slide longitudinally along the tie rods in use. The sliding plate 55 has a working cylinder 57 mounted thereon for cooperative movement with the sliding plate 55. As perhaps best seen in FIGS. 2a and 3, the sliding plate 55 has a central opening 82 which receives a draw rod 61. The draw rod 61 extends downwardly from a hollow inner tube 60. The cylinder 57 and sliding plate 55 have bores 78, 80 (FIG. 2a) which are sealed with O-ring seals, whereby the cylinder 57 can slide longitudinally along the hollow inner tube 60 (FIG. 3). This action can be seen, for example, in FIGS. 2e and 2f of the drawings. As can be seen in FIG. 3 of the drawings, the inner tube 60 is fixed to the top plate 17 at a threaded end 84. A tube 86 within-the-tube 60 is similarly fixed to the sliding plate 55 at a threaded end 88. The application of fluid pressure to the cylinder bore 64 causes the sliding plate 55 to move downwardly, while application of fluid pressure to the cylinder bore space 62 causes opposite relative longitudinal movement. The draw rod 61 is free to slide within the bore 82 of the working cylinder.

Figure 2A:
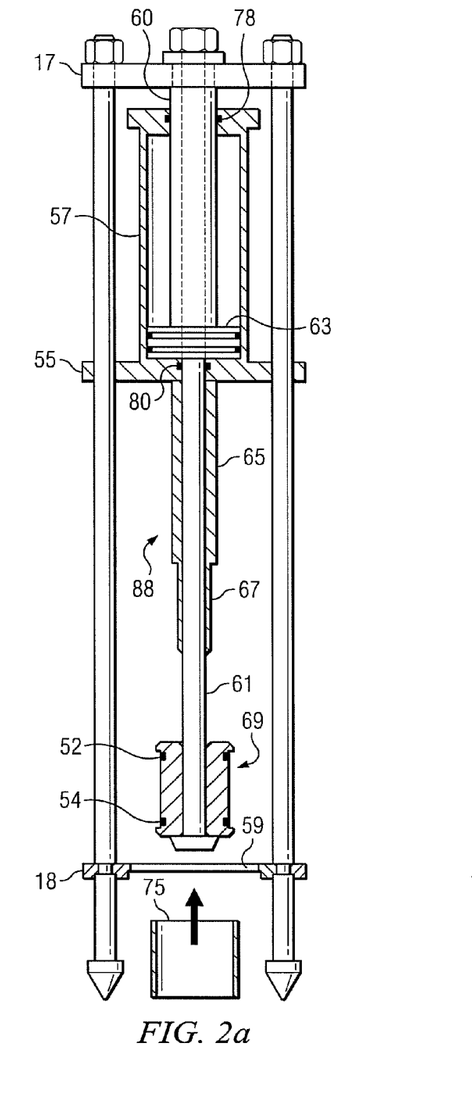
FIG. 2a-2k are side views of the apparatus of FIG. 1, shown partly in section, and showing the various sequential steps in the method of the invention in which a metal transition end is installed on the end of a plastic pipe.

As shown in FIGS. 1 and 2a, the draw rod 61 carries an actuating sleeve 88 which is free to slide along the outer surface of the draw rod. The actuating sleeve 88 has a stepped outer diameter which is larger in a first region 65 in the direction of the working cylinder 57 and an oppositely arranged relatively smaller region 67 (see FIG. 2a). The region of lesser relative external diameter 67 is located just above a segmented grip 69 of the draw rod. As will be appreciated from FIGS. 1 and 2a, the segmented grip 69 of the draw rod 61 is a cylindrically shaped body made up of a plurality of pie-shaped segments (such as segments 71, 73 in FIG. 1) which move radially inward and outward upon longitudinal movement of the actuating sleeve along the draw rod along the longitudinal axis generally aligned with the central opening of the sliding plate. The pie-shaped segments 71, 73, are held in position on the draw rod by means of O-rings (52, 54 in FIG. 2a), although other types of retainer elements could also be utilized, such as expandable springs. Thus, as can be seen in the operational views of FIGS. 2a and 2b, the segmented grip 69 is radially expandable and contractable upon longitudinal movement of the actuating sleeve 88 in order to grasp and release a cylindrical stiffener sleeve (75 in FIGS. 2a and 2b). The stiffener sleeve 75 is shown being held in place on the segmented gripper 69 in FIG. 2b.

As will be apparent from the operational description which follows, once the metal transition end (13 in FIG. 2e) is installed in a position surrounding the plastic pipe end (see FIGS. 2e and 2f), the apparatus is actuated in sequential fashion to cause the draw rod 61 and segmented grip 69 to position the captured stiffener sleeve 75 at a desired location within the plastic pipe end. This operation occurs from the direction of the open pipe end, rather from the opposite trailing end of the plastic pipe, as was true of a number of the prior art processes. The proper location of the stiffener ring assures that the metal transition end will be securely installed on the plastic pipe end. Once the stiffener ring has been installed in the desired location, the actuating sleeve can be withdrawn from the segmented grip, allowing the apparatus to be removed from the completed pipe end of the plastic pipe 15, leaving the stiffener sleeve in the previously installed location (FIG. 2l).

The operation of the apparatus of the invention will now be described with reference primarily to FIGS. 2a-2ki of the drawings, as follows:

FIG. 2a: In the beginning sequence of the operation, the metal stiffener sleeve 75 is placed in position over the segmented grip 69.

Figure 2B:
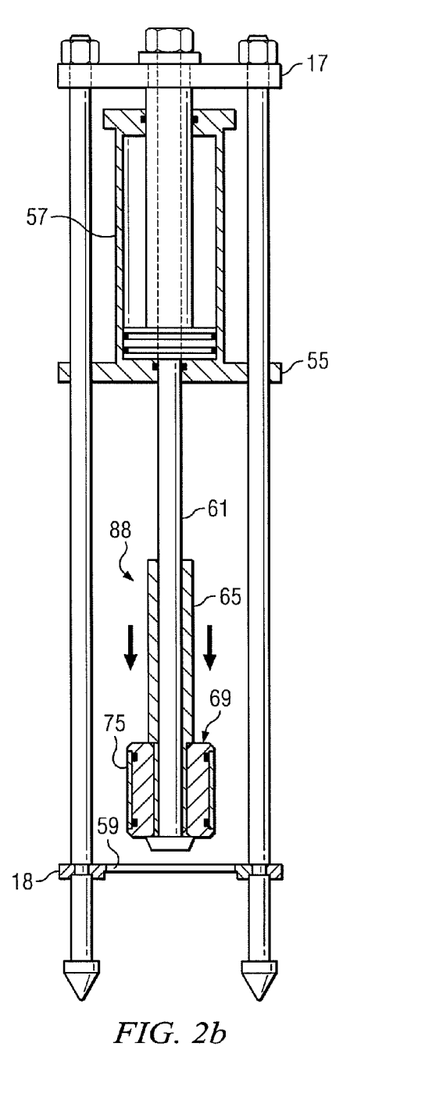
Figure 3:
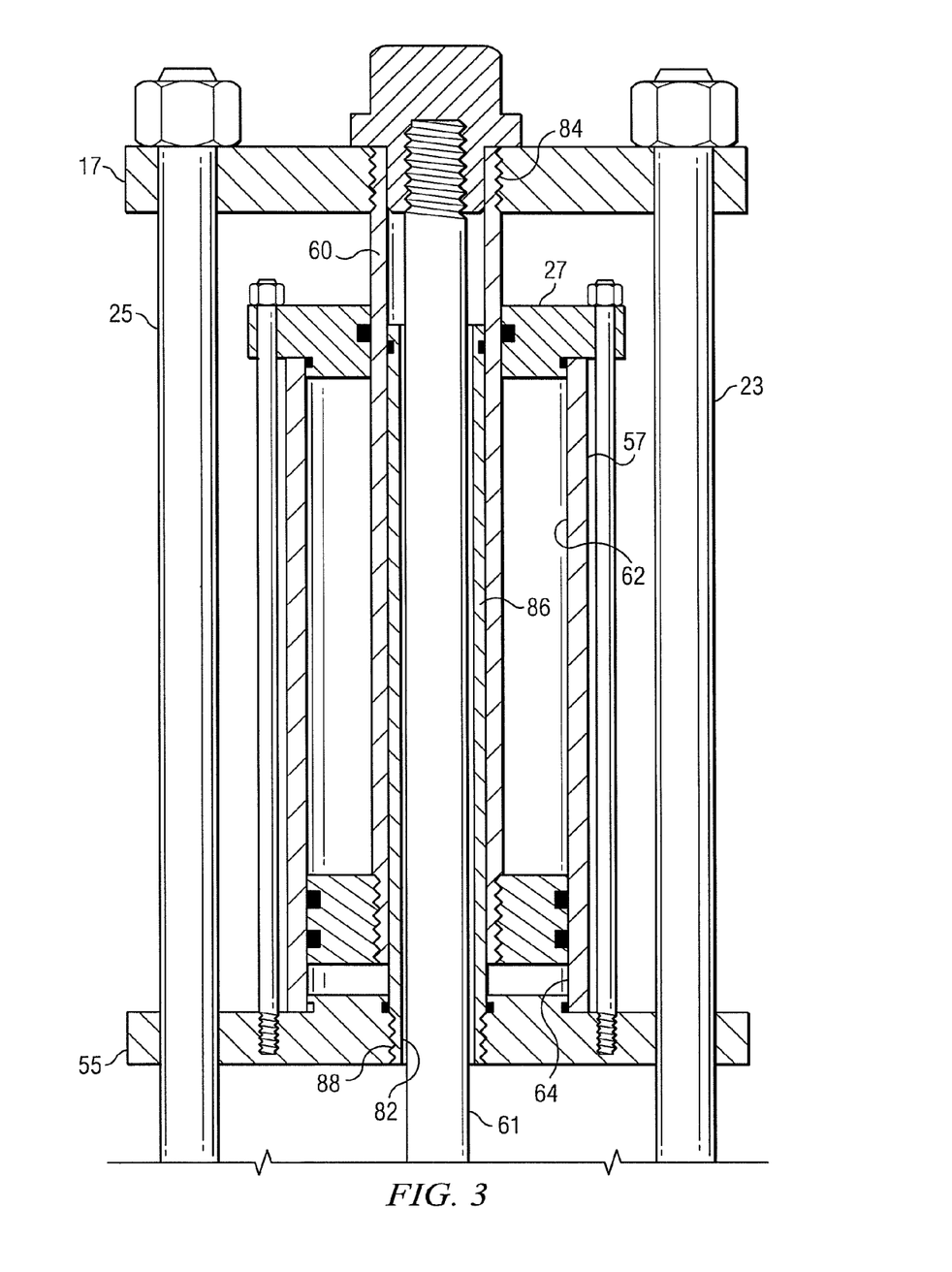
FIG. 3 is a side view, partly in section, of the upper end of the apparatus of FIG. 1 showing the details of the working cylinder.

FIG. 2b: The region of lesser relative diameter 67 of the actuating sleeve 88 is then forced into the central region of the segmented grip 69 causing the segments (71, 73 in FIG. 1) to be spread apart and thereby capturing the stiffener sleeve 75.

Figure 2C:
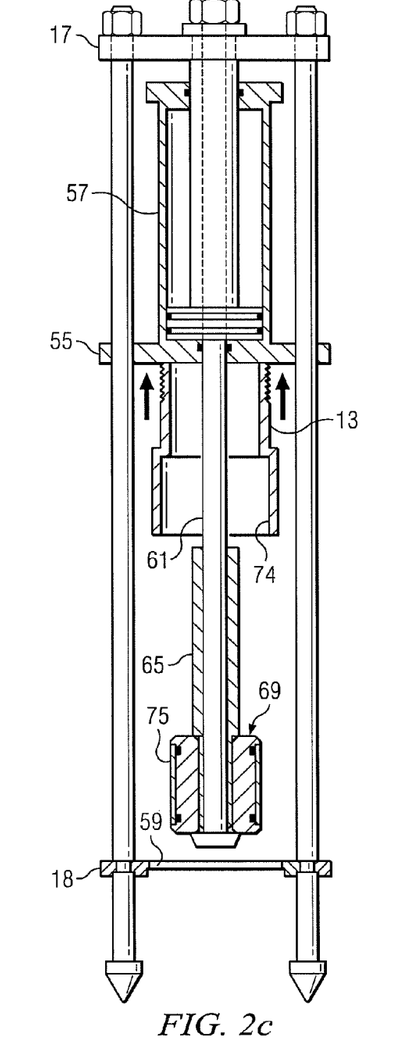

FIG. 2c: The metal transition end 13 is passed through the opening 59 in the plate 18 and moved upwardly until it contacts the sliding plate 55.

Figure 2D:
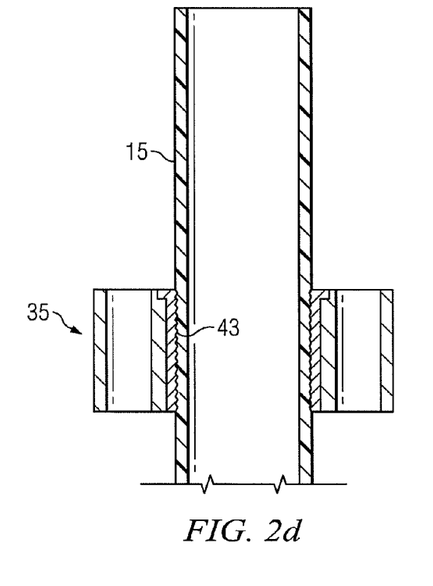
Figure 2E:
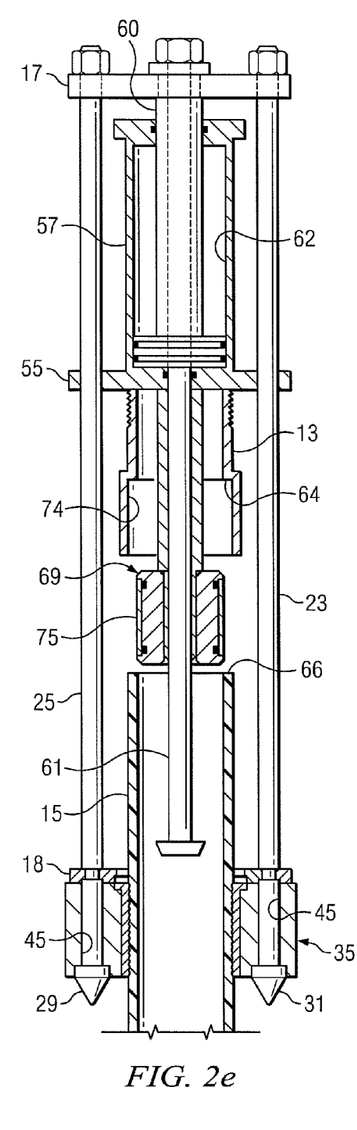
Figure 2F:
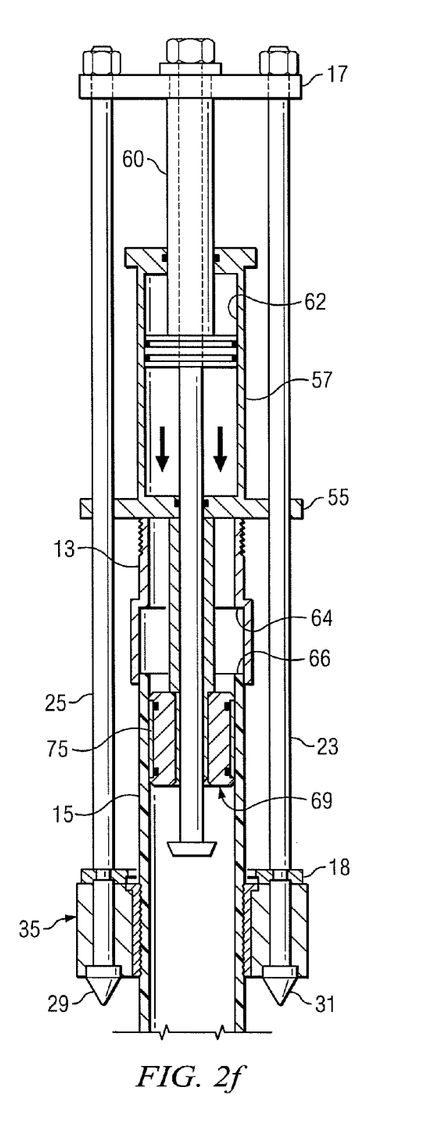

FIG. 2d: The plastic pipe end (15 in FIG. 2d) is clamped in place within the clamping ring 35.

FIG. 2e: The clamping ring 35 is then installed on the outer extent of the tie rods (shown as 23, 25 in FIG. 2e) and the tie rods are rotated to lock the tie rod ends within the keyhole shaped openings of the clamping ring, thereby locking the installer apparatus to the pipe string. The open end 15 of the plastic pipe extends about 9 inches above the upper planar surface of the clamping ring in FIG. 2e.

FIG. 2f: Fluid pressure is then applied to the working cylinder 57, causing the working cylinder and its associated sliding plate 55 to move downwardly. This action forces the stiffener sleeve 75 "into" the plastic pipe end and the transition end 13 "over" the plastic pipe end. The stiffener sleeve 75 precedes the transition end by about ½ inch in a typical installation as it and the transition end are positioned by the action of the installer apparatus. Note that the transition end 13 has a stepped internal diameter formed by an internal shoulder (64 in FIG. 2e). The outer end (66 in FIG. 2e) of the plastic pipe seats against this internal shoulder during a later step in the installation. Also note that the segmented grip 69 and its captured metal stiffener sleeve 75 are located in a position just outside the bore of the metal transition end 13. While the outer pipe end 66 will typically be fully seated against the internal shoulder 64, it will be appreciated that, in some instances, it may not fully seat, and yet still not affect the integrity of the overall installation.

Figure 2G:
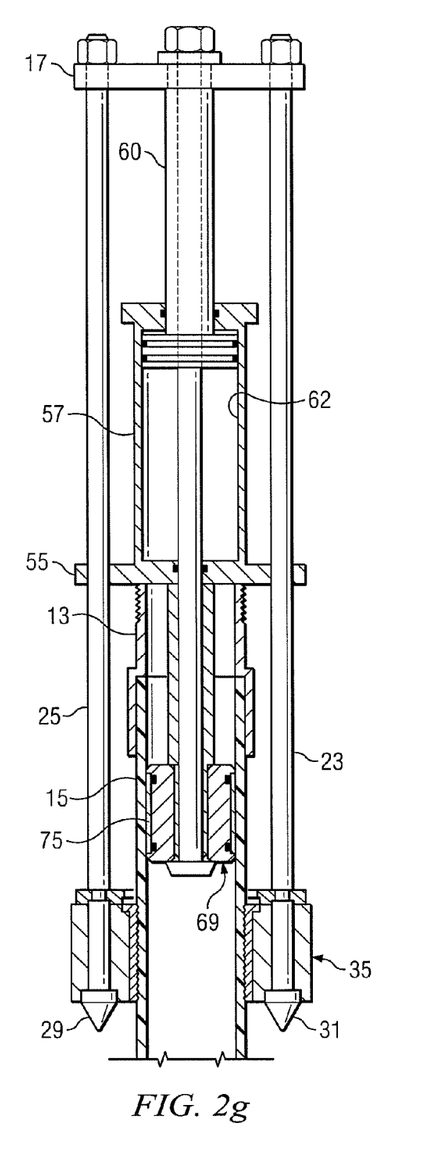

FIG. 2g: The continued movement of the sliding plate 55 in a downward direction causes the transition end 13 to be seated on the pipe end with the pipe end 66 contacting the internal shoulder 64 (see FIG. 2e) of the transition end.

Figure 2H:
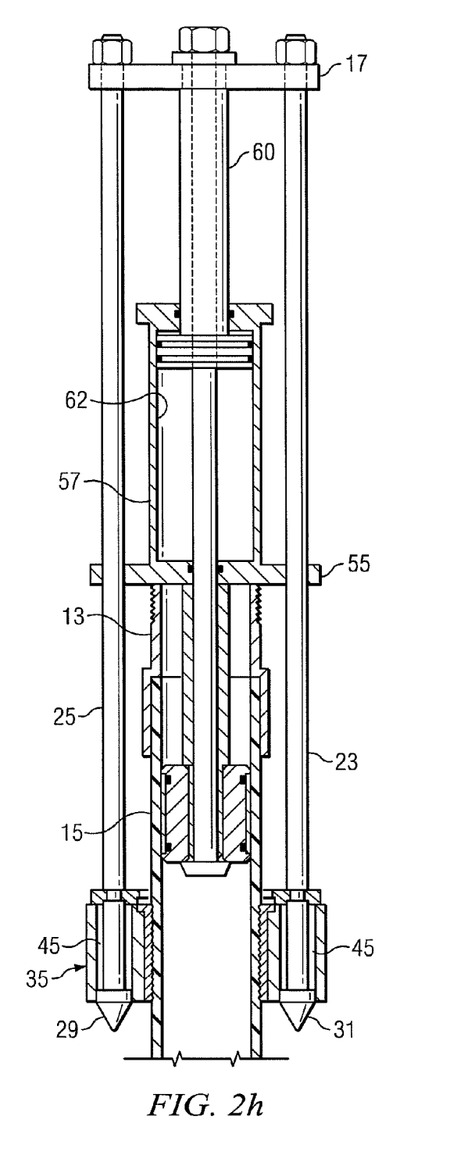

FIG. 2h: The tie rods are now rotated within the keyhole shaped openings of the clamping ring 35 to free the clamping ring from the installer device.

Figure 2I:
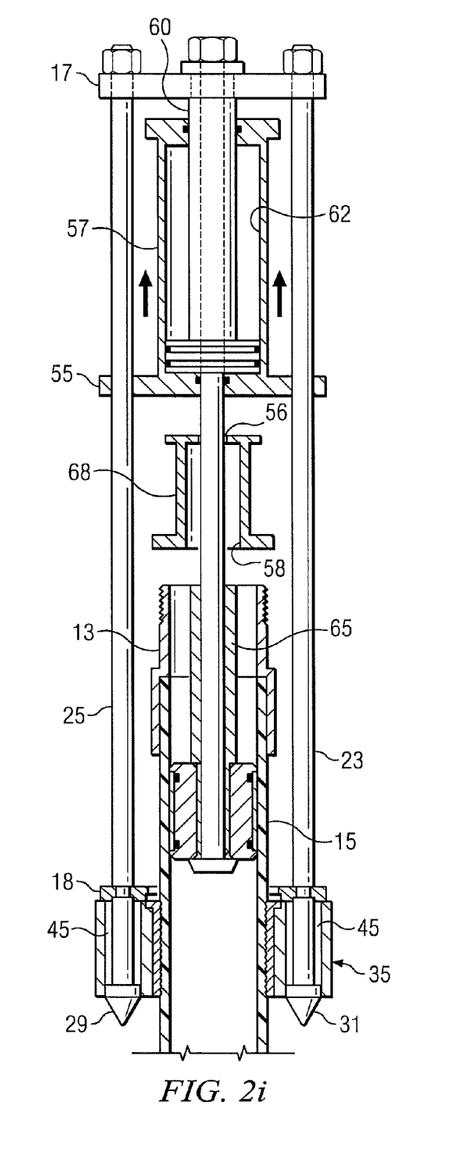

FIG. 2i: Fluid pressure is applied to the opposite end of the working cylinder 57, causing the sliding plate 55 to move upwardly. The spacer member 68 is then manually placed about the exterior of the draw rod 61 by passing it though a side slot 56 in the spacer. Note that the bottom opening 58 in the spacer is of larger relative diameter than the oppositely arranged top opening.

Figure 2J:
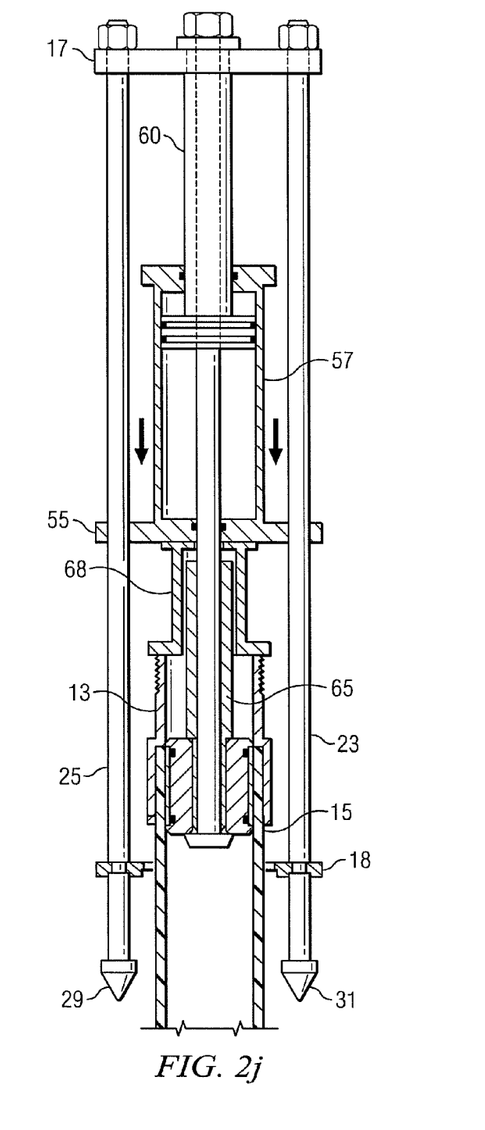

FIG. 2j: The clamping ring 35 has now been removed from the apparatus by withdrawing the tie rods from the mating holes provided in the clamping ring. Hydraulic fluid is supplied to the opposite end of the working cylinder 57, so that the sliding plate moves downwardly and acts upon the spacer member 68. This action causes the whole assembly to move and the pressure applied by the sliding plate 55 on the spacer member 68 serves to effect the installation of the stiffener ring in its proper position within the plastic pipe end. Note that the upper region 65 of the actuating sleeve is received within the bore of the spacer member 68. This allows the sliding plate to act upon the spacer member and, in turn, the transition end and causes the pipe end 15 to be expanded radially outward, thereby pressing the plastic into the internal grooves of the pipe gripping surface of the transition end 13 so as to position or install the stiffener sleeve within the transition end internal diameter.

Figure 2K:
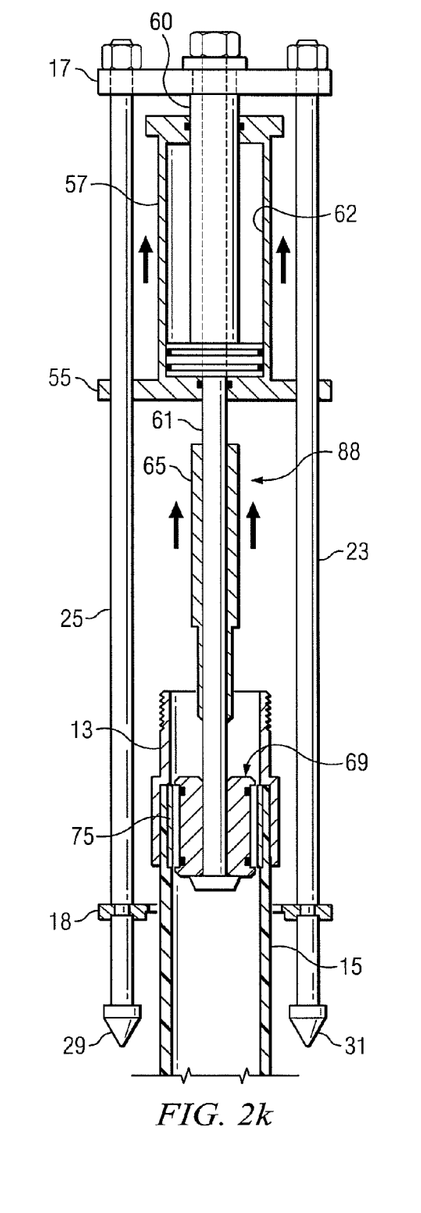
Figure 2L:
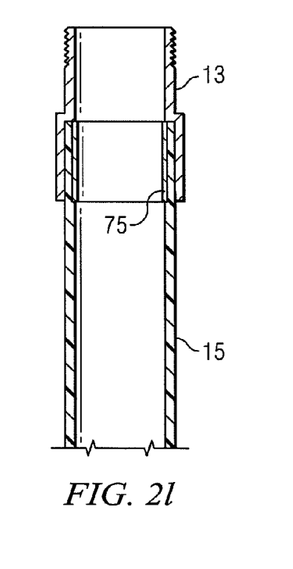
FIG. 2l is a view of one type of completed transition end which has been installed on the end of a length of plastic pipe, the pipe being shown broken away.

FIG. 2k: The working cylinder and associated sliding plate 55 are again retracted, allowing the actuating sleeve 88 to be withdrawn from within the interior of the segmented grip 69 and allowing the spacer member to be removed. It will be necessary to manually pull the actuating sleeve along the draw rod to release the segmented grip. The installer apparatus can then be removed from the completed pipe end. It will be appreciated that only four strokes of the working cylinder are required to install a transition end using the device of the invention, two to extend the cylinder and associated sliding plate and two to retract the same.

FIG. 2l: This figure shows the plastic pipe end 15 having the previously described, conventional transition end 13 installed thereon.

Figure 4:
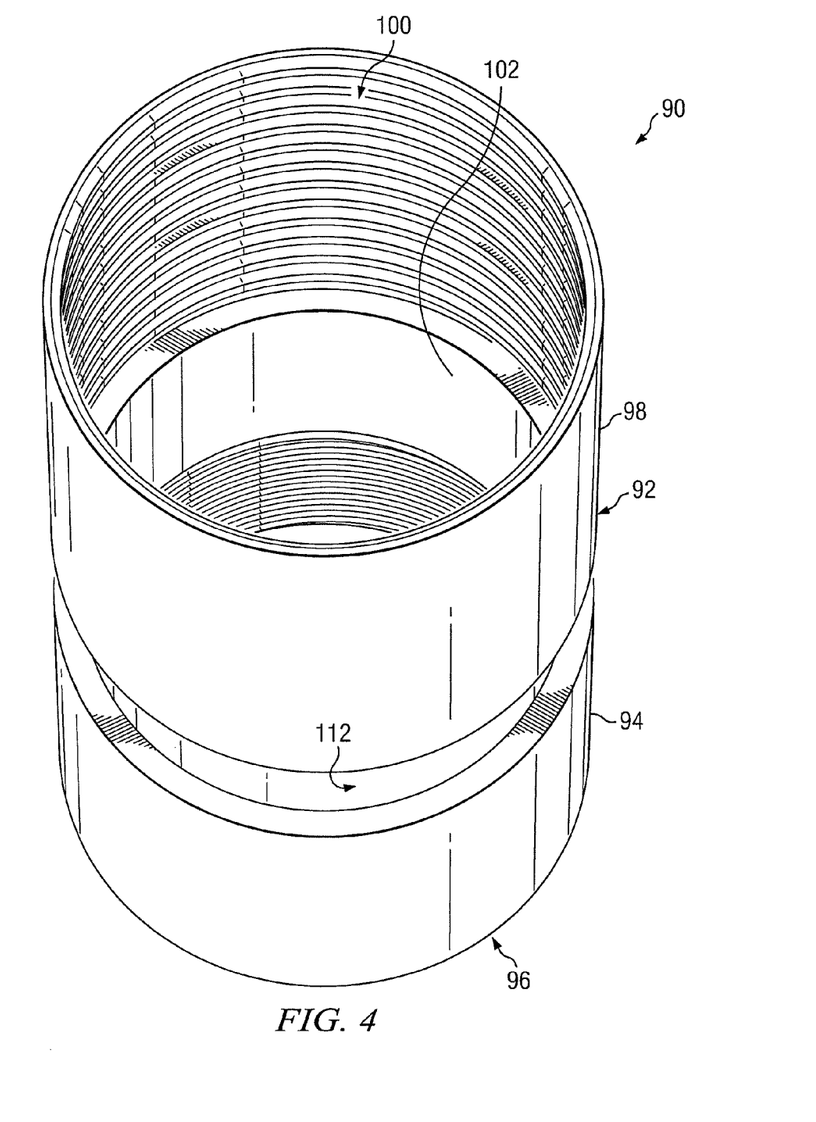
FIG. 4 is a perspective view of an improved metal transition end for use with the apparatus of FIG. 1, the transition end being shown with the plastic pipe receiving end up.
Figure 5:
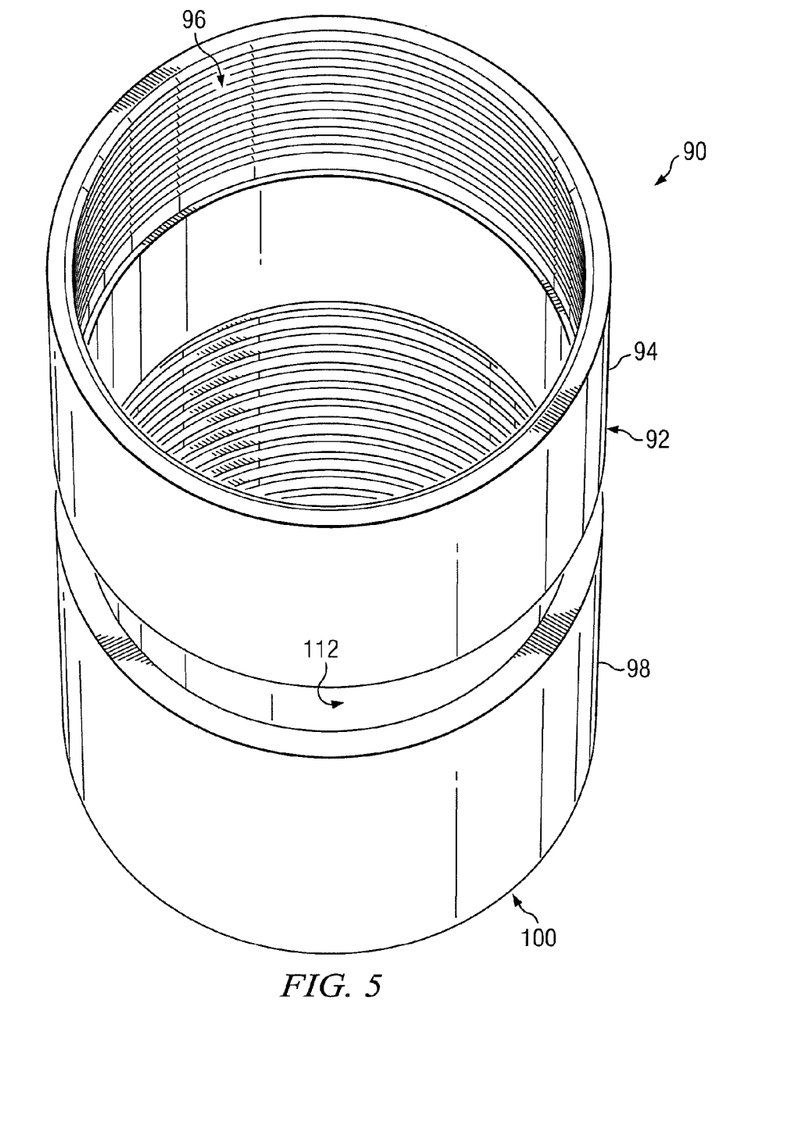
FIG. 5 is a view similar to FIG. 4, but showing the transition end with the female internally threaded end up.
Figure 6:
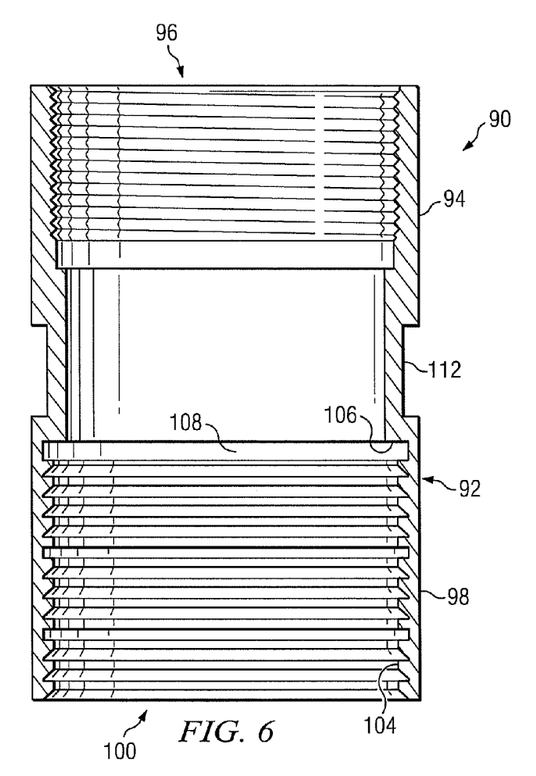
FIG. 6 is a side, cross sectional view of the improved metal transition end of the invention shown with the female, internally threaded end up.

FIGS. 4-6 show an improved metal transition end 90 which can be used with the previously described installer apparatus. The improved transition end is a generally cylindrical metal body 92 having a top end 94 with a top end opening 96 and a bottom end with a bottom end opening 100 and an interior surface 102 extending there between. Note that FIG. 4 shows the transition end as one would look through the bottom end opening 100 while FIG. 5 is oppositely arranged, showing the transition end as one would look through the top end opening 96. The plastic pipe end will ultimately be installed in the bottom end opening 100, as previously described.

As perhaps best seen in the cross sectional view of FIG. 6, the interior surface 104 adjacent the bottom end opening 100 is a grooved surface, the grooved surface extending upwardly from the bottom end opening 100 to a downwardly facing internal shoulder 106 which is of lesser relative diameter than the grooved surface 104. The grooved surface 104 terminates in a relief groove 108 which is provided adjacent the downwardly facing internal shoulder 106. The grooved surface 104 is merely provided in order to more firmly "grip" the installed pipe end (110 in FIG. 7). Its exact shape or profile can take various forms, for example, it may comprise rows of gripping "teeth." The relief groove 108 is of sufficient depth to accept any excess plastic material present as a result of installing the transition end 90 on the plastic pipe 110. In other words, the previously described apparatus of the invention "pulls" the stiffener sleeve 75 within the plastic pipe end 110. In some instances in the past, this action might actually squeeze some plastic over the internal shoulder, i.e., shoulder 106 and cause the segmented grip 69 to be caught or at least difficult to remove. The presence of the relief groove 108 accommodates any tendency of the plastic to move over the internal shoulder 106.

While the transition end 90 in FIGS. 4-7 is shown as having a female, internally threaded member as the top end opening, it will be understood that the top end opening could as easily be a male, externally threaded member. Otherwise, the details of the transition end would remain the same.

Figure 7:
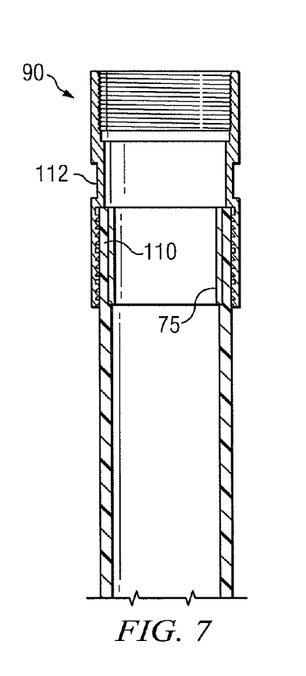
FIG. 7 is a side, cross sectional view of the transition end of FIG. 6 installed on the end of a section of plastic pipe, the pipe being broken away at one point along its length.

As shown in FIGS. 4-6, the improved transition end 90 can also be provided with an external groove located between the top end opening and the bottom end opening of the generally cylindrical body thereof. The external groove 112 is appropriately sized to receive a well head plate (not shown) once the transition end 90 has been installed on the plastic pipe end (as shown in FIG. 7) and the pipe is suspended in the well bore from a wellhead plate at the earth's surface. The installation of a wellhead plate is customary in the industry and is described, for example, in U.S. Pat. No. 7,571,764, to Jess Sammann, issued Aug. 11, 2009.

An invention has been provided with several advantages. The apparatus of the invention is relatively simple in design and economical to manufacture. The apparatus can be used to install a metal transition end on a plastic pipe, such as the pipe leading to a submersible well pump, or to a natural gas pipeline, or other type pipeline. The apparatus can be easily used in the field to install a transition end, since the device operates on the plastic pipe from the open end of the pipe, rather than from the opposite pipe end. This eliminates the need to install the transition end on a short length of plastic pipe, followed by butt fusing the short length to the remaining length of pipe. Because of the way the internal stiffener ring is installed, any slippage between the transition end and the plastic pipe is eliminated. Because of the tolerances involved, there is typically no cold flow of the pipe end. In one version of the invention, a special metal transition end is provided with an internal relief groove to accommodate any flow of plastic, should that occur. The installed end using the device of the invention results in a plastic pipe end of the same size internal diameter as at the beginning of the operation.

While the invention has been shown in only two of its forms, it is not thus limited but is susceptible to various changes and modifications without departing from the spirit thereof.

What is claimed is:

1. A method for installing a metal transition end on a length of plastic pipe having an outer diameter and an inner diameter and an open end by placing a stiffener sleeve within the inner diameter of the plastic pipe at a desired location and at a point which is circumscribed by the metal transition end, the method comprising the steps of:

forming the metal transition end as a generally cylindrical metal body having a top end with a top end opening and a bottom end with a bottom end opening and an interior surface extending there between, the interior surface adjacent the bottom end opening being formed as a grooved surface, the grooved surface extending upwardly from the bottom end opening to a downwardly facing internal shoulder which is of lesser relative diameter than the grooved surface;

wherein the grooved surface terminates in a relief groove which is provided adjacent the downwardly facing internal shoulder, the relief groove being of sufficient depth to accept excess plastic material present as a result of installing the transition end on a plastic pipe;

wherein the downwardly facing internal shoulder creates a stepped internal diameter, the internal shoulder dividing the internal diameter into a first region of lesser relative diameter and a first region of greater relative diameter;

wherein the length of plastic pipe has an open end portion which is slidingly received within the metal transition end, the pipe open end portion having an outermost extent which abuts against the internal shoulder formed within the internal diameter of the transition end when the metal transition end is installed on the length of plastic pipe;

placing an installer apparatus over the length of plastic pipe and the metal transition end from the direction of the open end of the plastic pipe, the installer apparatus being provided with a draw rod which extends along a horizontal axis generally aligned with the open pipe end and which terminates in a segmented grip, the draw rod also having an actuating sleeve slidingly mounted thereon;

temporarily mounting a metal stiffener sleeve on the segmented grip of the draw rod by using the actuating sleeve on the draw rod to radially expand the segmented grip and, in turn, grip the stiffener sleeve to thereby capture the stiffener sleeve on the segmented grip without expanding the stiffener sleeve;

using the apparatus to install the stiffener sleeve within the inner diameter of the plastic pipe adjacent the open end thereof at a location circumscribed by the region of relatively eater internal diameter of the metal transition end;

the installation being accomplished by the following sequential steps:

first pushing the stiffener sleeve into the open end portion of the plastic pipe by extending the segmented grip and draw rod along the inner diameter of the plastic pipe in a direction away from the pipe open end;

next forcing the metal transition end over the open end portion of the plastic pipe, the metal stiffener ring remaining at a location within the pipe inner diameter below the location of the metal transition end which circumscribes the pipe open end portion;

next using the segmented grip and draw rod to pull the metal stiffener ring in the direction of the pipe open end, whereby the stiffener ring is positioned within the inner diameter of the plastic pipe within the region circumscribed by the region of relatively greater internal diameter of the metal transition end;

moving the actuating sleeve to relax the gripping segments and withdrawing the segmented grip and draw rod in order to leave the stiffener sleeve at the previously described location, the open end portion of the plastic pipe having the same inner diameter as at the beginning of the installation method.

2. A method for installing a metal transition end on an open end portion of a length of plastic pipe having an inner diameter, an outer diameter and an open end, the method comprising the steps of:

providing a stationary section of the apparatus including a top plate having an outer planar surface and an inner planar surface and a plurality of tie rods being arranged generally perpendicular to the inner planar surface of the top plate, the stationary section of the apparatus further including a cooperating clamping ring installable upon the plurality of tie rods at an end thereof opposite the top plate, the clamping ring having a central pipe receiving opening for receiving and securely grasping the open end of the plastic pipe;

providing a mobile section of the apparatus including a sliding plate mounted on the lie rods between the top plate and the clamping ring, the sliding plate having a working cylinder mounted thereon for movement with the sliding plate, and wherein the sliding plate has a central opening aligned with the central pipe receiving opening and a draw rod which extends downwardly from the working cylinder through the central opening, and wherein the draw rod has an actuating sleeve slidingly mounted thereon, the draw rod also having a segmented grip located on one end thereof which is radially expandable and contractable upon longitudinal movement of the actuating sleeve carried on the draw rod in order to grasp a stiffener sleeve on the segmented grip without expanding the stiffener sleeve and to subsequently release the stiffener sleeve;

forming the metal transition end as a generally cylindrical metal body having a top end with a top end opening and a bottom end with a bottom end opening and an interior surface extending there between, the interior surface adjacent the bottom end opening being formed as a grooved surface, the grooved surface extending upwardly from the bottom end opening to a downwardly facing internal shoulder which is of lesser relative diameter than the grooved surface;

wherein the grooved surface terminates in a relief groove which is provided adjacent the downwardly facing internal shoulder, the relief groove being of sufficient depth to accept excess plastic material present as a result of installing the transition end on a plastic pipe;

wherein the downwardly facing internal shoulder creates a stepped internal diameter, the internal shoulder dividing the internal diameter into a first region of lesser relative diameter and a first region of greater relative diameter;

wherein the length of plastic pipe has an open end portion which is slidingly received within the metal transition end, the pipe open end portion having an outermost extent which abuts against the internal shoulder formed within the internal diameter of the transition end when the metal transition end is installed on the length of plastic pipe;

wherein, once the metal transition end is installed in a position circumscribing the plastic pipe end, the apparatus is actuated in sequential fashion to cause the draw rod, actuating sleeve and segmented grip to locate the stiffener sleeve in a desired position within the open end portion of the plastic pipe by operating from the direction of the open end of the pipe and to thereby firmly secure the metal transition end on the plastic pipe, the metal stiffener sleeve being located within the inner diameter of the plastic pipe adjacent the open end thereof at a location circumscribed by the region of relatively greater internal diameter of the metal transition end;

the installation being accomplished by the following sequential steps:

first pushing the stiffener sleeve into the open end portion of the plastic pipe by extending the segmented grip and draw rod along the inner diameter of the plastic pipe in a direction away from the pipe open end;

next forcing the metal transition end over the open end portion of the plastic pipe, the metal stiffener ring remaining at a location within the pipe inner diameter below the location of the metal transition end which circumscribes the pipe open end portion;

next using the segmented grip and draw rod to pull the metal stiffener ring in the direction of the pipe open end, whereby the stiffener ring is positioned within the inner diameter of the plastic pipe within the region circumscribed by the region of relatively greater internal diameter of the metal transition end;

moving the actuating sleeve to relax the gripping segments and withdrawing the segmented grip and draw rod in order to leave the stiffener sleeve at the previously described location, the open end portion of the plastic pipe having the same inner diameter as at the beginning of the installation method.

3. The method of claim 2, wherein the actuating sleeve is moved along the draw rod out of contact with the segmented grip to thereby release the stiffener sleeve and allow the draw rod to be withdrawn from the open pipe end.

4. The method of claim 3, wherein the actuating sleeve which is carried on the draw rod is formed with a stepped outer diameter which is larger in the direction of the working cylinder and relatively smaller in the direction of the segmented grip and wherein the segmented grip of the draw rod is formed as a cylindrically shaped body made up of a plurality of pie-shaped segments which move radially inward and outward upon longitudinal movement of the actuating sleeve along the longitudinal axis generally aligned with the central opening of the sliding plate.

5. The method of claim 4, wherein the working cylinder is provided having an internal hollow rod which receives an end region of the draw rod.

6. The method of claim 5, wherein the clamping ring is made up of two locking halves which are connected along a pivot axis, whereby the two halves can be pivoted apart to form a pipe receiving opening, and wherein the central opening of the clamping ring is provided with a pair of jaws which provide a gripping surface to engage an outer surface of the plastic pipe inserted between the two locking halves of the clamping ring.

7. The method of claim 6, wherein the tie rods are formed having tapered ends and wherein the clamping ring has mating holes for receiving the tie rods to temporarily secure the stationary portion of the apparatus to the clamping ring.

8. The method of claim 7, wherein the clamping ring is formed having an upper planar surface and a lower planar surface, and wherein the mating holes in the clamping ring communicate the inner and planar surfaces and are keyhole shaped, whereby the clamping ring can be temporarily secured to the tapered ends of the tie rods by rotating the tie rods into an engaged position within the mating holes of the clamping ring, and wherein the keyhole shaped holes adjacent the lower planar surface of the clamping ring are recessed.

* * * * *